United States Patent
Sitton et al.

(10) Patent No.: US 11,581,131 B2
(45) Date of Patent: Feb. 14, 2023

(54) ASYMMETRIC 24-PULSE AUTOTRANSFORMER RECTIFIER UNIT FOR TURBOELECTRIC PROPULSION, AND ASSOCIATED SYSTEMS AND METHODS

(71) Applicant: ELDEC Corporation, Lynnwood, WA (US)

(72) Inventors: Travis Sitton, Lynnwood, WA (US); Kaz Furmanczyk, Lynnwood, WA (US)

(73) Assignee: ELDEC Corporation, Lynnwood, WA (US)

( * ) Notice: Subject to any disclaimer, the term of this patent is extended or adjusted under 35 U.S.C. 154(b) by 0 days.

(21) Appl. No.: 17/627,565

(22) PCT Filed: Apr. 29, 2020

(86) PCT No.: PCT/US2020/030440
§ 371 (c)(1),
(2) Date: Jan. 14, 2022

(87) PCT Pub. No.: WO2021/011052
PCT Pub. Date: Jan. 21, 2021

(65) Prior Publication Data
US 2022/0208444 A1     Jun. 30, 2022

Related U.S. Application Data

(60) Provisional application No. 62/874,782, filed on Jul. 16, 2019.

(51) Int. Cl.
*H01F 30/02* (2006.01)
*G05F 1/14* (2006.01)
(Continued)

(52) U.S. Cl.
CPC .............. *H01F 30/02* (2013.01); *G05F 1/14* (2013.01); *H01F 27/28* (2013.01); *H01F 27/40* (2013.01);
(Continued)

(58) Field of Classification Search
CPC .......... H01F 30/02; H01F 30/06; H01F 30/12; H01F 30/14; H01F 27/28; H01F 27/29;
(Continued)

(56) References Cited

U.S. PATENT DOCUMENTS

| | | | | |
|---|---|---|---|---|
| 5,619,407 A | * | 4/1997 | Hammond | ............... H01F 30/14 363/148 |
| 7,375,996 B2 | * | 5/2008 | Singh | ...................... H01F 30/14 363/149 |

(Continued)

OTHER PUBLICATIONS

International Search Report and Written Opininion, PCT/US2020/030440, dated Sep. 14, 2020, 18 pages.

*Primary Examiner* — Yemane Mehari
(74) *Attorney, Agent, or Firm* — Christensen O'Connor Johnson Kindness PLLC

(57) ABSTRACT

Asymmetric AC to DC autotransformer for turboelectric propulsion, and associated systems and methods are described herein. In one embodiment, an asymmetric AC to DC autotransformer includes: a first coil, a second coil and a third coil of a delta winding Each coil is energized at its corresponding input phase. A first plurality of correction windings coupled to the first coil, a second plurality of correction windings coupled to the second coil, and a third plurality of correction windings coupled to the third coil. A bridge rectifier having a plurality of rectifiers is coupled to respective individual correction windings. Phases of the individual correction windings are asymmetric such that individual phase voltages are controlled relative to the (Continued)

opposite input phase. Voltages are unbalanced relative to neutral.

8 Claims, 17 Drawing Sheets

(51) Int. Cl.
    *H01F 27/28*     (2006.01)
    *H01F 27/40*     (2006.01)
    *H02M 7/06*     (2006.01)
    *H02M 7/08*     (2006.01)

(52) U.S. Cl.
    CPC ............. *H02M 7/068* (2013.01); *H02M 7/08* (2013.01); *H01F 2027/408* (2013.01)

(58) Field of Classification Search
    CPC ...... H01F 27/40; H01F 2027/408; G05F 1/14; H02M 7/068; H02M 7/08
    USPC .......................................................... 363/125
    See application file for complete search history.

(56) References Cited

U.S. PATENT DOCUMENTS

| | | | | |
|---|---|---|---|---|
| 7,750,782 B1 * | 7/2010 | Paice | ...................... | H01F 30/14 363/148 |
| 7,796,413 B2 * | 9/2010 | Furmanczyk | ........... | H01F 30/14 363/149 |
| 9,966,868 B2 * | 5/2018 | Nunamaker | ............ | H02M 7/06 |

\* cited by examiner

ASYMMETRIC 24-PULSE AUTOTRANSFORMER RECTIFIER UNIT FOR TURBOELECTRIC PROPULSION, AND ASSOCIATED SYSTEMS AND METHODS

CROSS-REFERENCE(S) TO RELATED APPLICATION(S)

This application claims priority to U.S. Provisional Patent Application No. 62/874,782, filed Jul. 16, 2019, which is incorporated by reference herein in its entirety.

BACKGROUND

Modern aircraft increasingly use electricity for on-board actuators. Furthermore, an entirely new category of electrically driven aircraft engines is being developed. As a result, power quality in AC to DC converters should be increased for the electric aircraft architectures.

Some conventional systems rely on a hexagonal winding configuration to establish 12 AC phases (allowing 24-pulse rectification) that are converted to a DC voltage. However, these conventional systems are prone to triplen harmonics, which limits their use for aerospace applications. Triplen harmonics are odd harmonics which become co-phasal in a 3-phase system. Such harmonics are $3^{rd}$ harmonic, $9^{th}$ harmonic, $15^{th}$ harmonic, and so on. Being co-phasal, these harmonics do not cancel out in a 3-phase system and need a return path or a delta loop to circulate. In the absence of these provisions, presence of triplen harmonic currents create problems like unequal voltages and excessive power dissipation. Mitigating triplen harmonics typically involves additional windings or a larger core, resulting in increased weight and reduced efficiency. On the other hand, a conventional autotransformer configuration that requires 8 windings per phase would require 9 windings per phase to mitigate triplen harmonics. With conventional autotransformers, the additional winding per phase is necessary to form a delta winding dedicated to triplen harmonic mitigation to provide a low impedance pass for triplen harmonic currents.

Other conventional designs are based on delta-wound symmetrical autotransformers that provide 12 output phases from 3 input phases to a plurality of bridge rectifiers to allow 24-pulse AC to DC conversion. With delta-wound symmetrical approach, phases are designed to have even magnitude and phasing relative to neutral. The delta-wound symmetrical approach achieves low current distortion with inherent triplen harmonic mitigation, but it requires the addition of interphase transformers, and it requires the autotransformer to process all power supplied to the load and thereby incurs a weight and efficiency penalty relative to asymmetric power processing techniques. As a result, symmetrical solution has higher weight and lower efficiency than is acceptable for aerospace applications.

In summary, the above-described conventional approaches suffer from one or more following shortcomings: lack of inherent triplen harmonic mitigation, complex assembly processes requiring 8 or more windings per core leg, high weight, and low efficiency. On the other hand, AC to DC converters which provide less than 24-pulse behavior, for instance 18-pulse and 12-pulse ATRUs which are common in modern aerospace applications, are available with low weight, high efficiency, and inherent triplen harmonic mitigation. However, these 18-pulse and 12-pulse ATRUs cannot provide high power quality and low current distortion (<5% total harmonic distortion or THDi) provided by the 24-pulse conversion. Accordingly, systems and methods are needed for AC to DC converters capable of providing 24-pulse conversion and triplen harmonic mitigation with acceptable weight and operational efficiency in order to support aerospace application needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The inventive technology allows conversion from a 3-phase AC voltage to a DC voltage of approximately 2.35 times the magnitude of the average input phase-to-neutral RMS voltage magnitude. For example, the present technology provides a nominal 540 Volt DC output from a commonly used 230 Volt AC input in modern aerospace power systems. The output voltage is proportional to input voltage.

Inventive technology combines an autotransformer and a rectifier which form a 24-pulse Auto-Transformer Rectifier Unit (ATRU). The three input phases may be fed directly to three nodes on the bridge rectifier to provide three of the twelve phases necessary for 24-pulse rectification. The power path formed by direct connection of the three input phases to the bridge rectifier processes the majority of power being processed by the ATRU (e.g., about ⅔ or 66% of the power), which allows significant size reduction of the autotransformer. The autotransformer consists of three coils forming a delta configuration. The three input phases are also fed to the delta coils of the autotransformer.

Each coil includes several serial windings. Each of the three coils of the delta-wound autotransformer may include four serial windings which form a side of the delta and three correction windings. Collectively, the nine correction windings provide the nine output points with proper magnitude and phasing relative to the three input phases for a combined 24-pulse operation (nine phases from the correction windings, and three phases from the input phases). These 12 phases are rectified directly into 24 pulses by the bridge rectifier without need for additional Interphase Transformers (IPTs) which are typically used in known conventional systems.

In one embodiment, a system includes an asymmetric autotransformer having: a first coil, a second coil and a third coil of a delta winding, wherein each coil is energized at its corresponding input phase; a first plurality of correction windings coupled to the first coil; a second plurality of correction windings coupled to the second coil; and a third plurality of correction windings coupled to the third coil. The system also includes a bridge rectifier having a plurality of rectifiers coupled to respective individual correction windings, where phases of the individual correction windings are asymmetric such that individual phase voltages are controlled relative to the opposite input phase, and where voltages are unbalanced relative to neutral.

In one aspect, each plurality of correction windings includes three individual windings. In another aspect, tap points of each plurality of correction windings separate each corresponding coil of the delta winding into four segments.

In one aspect, the bridge rectifier receives 12 AC phases at inputs of its corresponding diodes, and the bridge rectifier outputs DC voltage. In another aspect, the bridge rectifier includes: a main rectifier configured for rectifying AC voltages of the input phases; and a secondary rectifier configured for rectifying AC voltages of the correction windings. In one aspect, the main rectifier provides about 66% of DC power, and the secondary rectifier provides about 34% of DC power.

In one aspect, the delta winding constitutes a low impedance pass for triplen harmonics. In another aspect, individual phase voltages are about 15 deg offset from one phase to a next adjacent phase at the bridge rectifier.

In one embodiment, a method for designing an autotransformer having a first coil, a second coil and a third coil of a delta winding includes: selecting turns count for a first coil, a second coil and a third coil of a delta winding; selecting 3 tap locations for correction windings along each of the first coil, the second coil and the third coil of the delta winding, wherein the tap points divide each of the first coil, the second coil and the third coil into 4 segments; constructing transformer vector diagram using an equilateral triangle with leg lengths proportional to a number of turns between input phases of a 3-phase input, where each side of the triangle represents a complete coil of the delta winding. The method also includes drawing lines representing individual correction windings off of each tap location along the first, second and third coils of the delta winding, where each line is represented as a vector of a first plurality of vectors with a phase equivalent to a phase of the coil the correction winding is wound upon and length proportional to correction windings turn count, and each vector of the first plurality of vectors runs parallel to one of the sides of the triangle. The method also includes determining each correction winding's turns ratio by the length of a corresponding vector of the first plurality of vectors; and determining a number of turns in each correction winding as a multiple of the turns ratio and the number of turns in the complete coil of the delta winding.

In one aspect, the method also includes determining output phases of the autotransformer by: drawing a vector of a second plurality of vectors from the end of each correction winding vector to the opposite vertex of the equilateral triangle; and determining the output phase of the individual correction winding by a length of the corresponding vector of a second plurality of vectors.

In one aspect, an output phase of each correction winding is proportional to the corresponding output phase's magnitude relative to the phase represented by the opposite vertex of the triangle.

In another aspect, output voltages of the autotransformer are controlled as phase-to-phase voltages and not as phase-to-neutral voltages.

In one aspect, adjacent bridge rectifier conduction pairs are spaced apart by approximately 15 degree.

In one aspect, the 4 segments along individual coils of the delta winding have turns ratios of N1=0.17, N2=0.24, N3=0.42, and N4=0.17; and individual correction windings have turns ratios of N5=0.13, N6=0.13 and N7=0.18; where the turns ratio is defined as a number of turns in a segment or in a correction winding divided by a total number of turns in the coil of the delta winding.

In another aspect, the 4 segments along individual coils of the delta winding have turns ratios of N1=0.17, N2=0.42, N3=0.11, and N4=0.30; and individual correction windings have turns ratios of N5=0.18, N6=0.13 and N7=0.13; where the turns ratio is defined as a number of turns in a segment or in a correction winding divided by a total number of turns in the coil of the delta winding.

In another aspect, the 4 segments along individual coils of the delta winding have turns ratios of N1=0.30, N2=0.11, N3=0.29, and N4=0.30; and individual correction windings have turns ratios of N5=0.13, N6=0.18 and N7=0.13; where the turns ratio is defined as a number of turns in a segment or in a correction winding divided by a total number of turns in the coil of the delta winding.

In another aspect, the 4 segments along individual coils of the delta winding have turns ratios of N1=0.17, N2=0.24, N3=0.29, and N4=0.30; and individual correction windings have turns ratios of N5=0.13, N6=0.18 and N7=0.13; where the turns ratio is defined as a number of turns in a segment or in a correction winding divided by a total number of turns in the coil of the delta winding.

In another aspect, the 4 segments along individual coils of the delta winding have turns ratios of N1=0.30, N2=0.29, N3=0.24, and N4=0.17; and individual correction windings have turns ratios of N5=0.13, N6=0.18 and N7=0.13; where the turns ratio is defined as a number of turns in a segment or in a correction winding divided by a total number of turns in the coil of the delta winding.

In another aspect, the 4 segments along individual coils of the delta winding have turns ratios of N1=0.30, N2=0.29, N3=0.11, and N4=0.30; and individual correction windings have turns ratios of N5=0.13, N6=0.18 and N7=0.13; where the turns ratio is defined as a number of turns in a segment or in a correction winding divided by a total number of turns in the coil of the delta winding.

In another aspect, the 4 segments along individual coils of the delta winding have turns ratios of N1=0.30, N2=0.11, N3=0.42, and N4=0.17; and individual correction windings have turns ratios of N5=0.13, N6=0.13 and N7=0.18; where the turns ratio is defined as a number of turns in a segment or in a correction winding divided by a total number of turns in the coil of the delta winding.

In another aspect, the 4 segments along individual coils of the delta winding have turns ratios of N1=0.17, N2=0.42, N3=0.24, and N4=0.17; and individual correction windings have turns ratios of N5=0.18, N6=0.13 and N7=0.13; where the turns ratio is defined as a number of turns in a segment or in a correction winding divided by a total number of turns in the coil of the delta winding.

DESCRIPTION OF THE DRAWINGS

The foregoing aspects and the attendant advantages of the inventive technology will be more readily appreciated as the same become better understood by reference to the following detailed description, when taken in conjunction with the accompanying drawings, wherein.

DETAILED DESCRIPTION

Figure 1A:
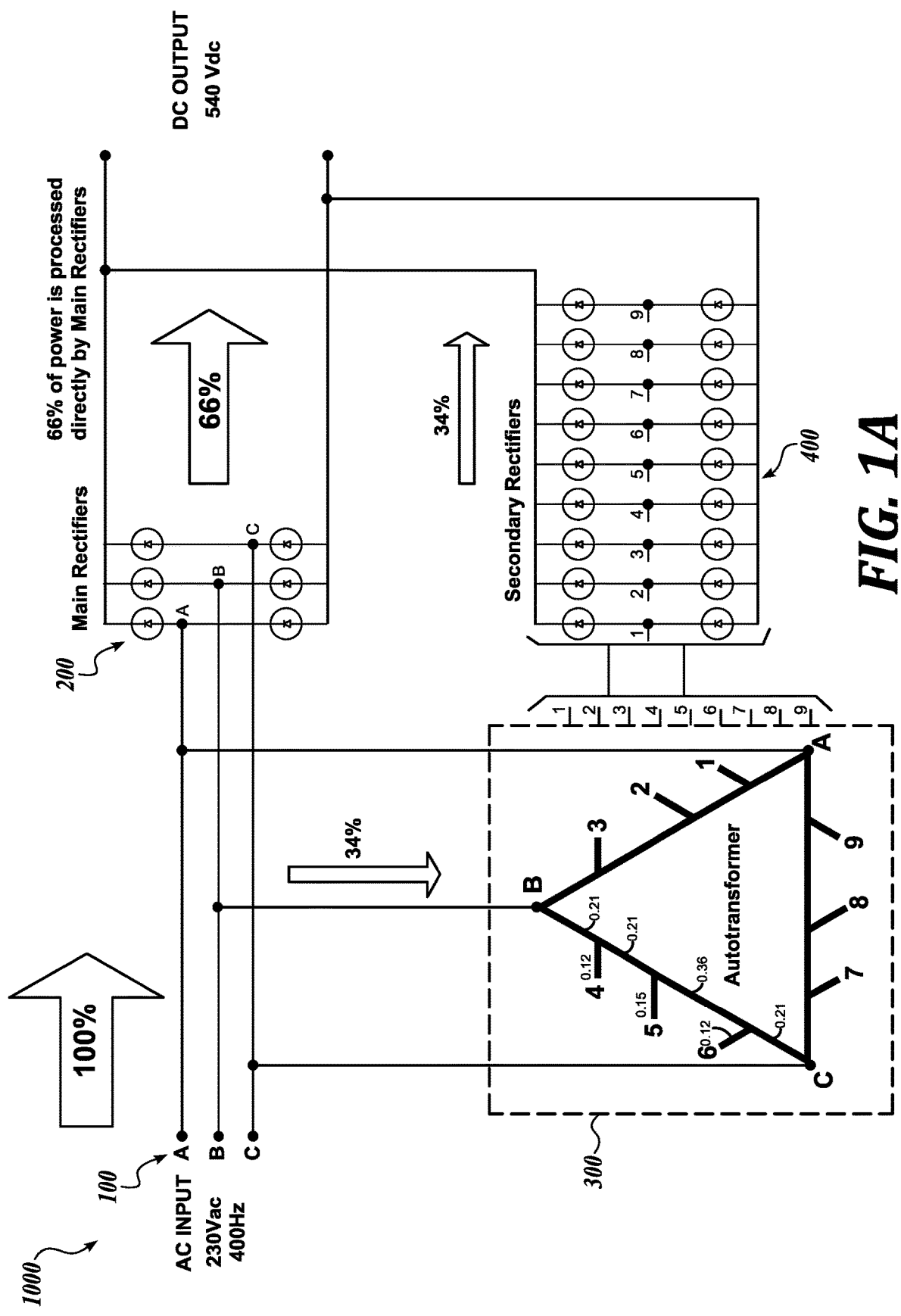
FIG. 1A illustrates an ATRU according to an embodiment of inventive technology.

While illustrative embodiments have been illustrated and described, it will be appreciated that various changes can be made therein without departing from the spirit and scope of the invention.

Commercial aircraft continue to evolve into More Electric Aircraft (MEA), featuring increased electrical content in place of hydraulic and pneumatic systems. Recent advances in the fields of power electronics and high-density electric motors, along with continued pressure to reduce operating costs, ensure that this trend will continue. Furthermore, the aircraft electric propulsion is moving toward hybrid-electric, turbo-electric, and even all-electric powertrains. Under some scenarios, the move to electric propulsion is expected to increase electrical system power demand by greater than forty times.

However, conventional power conversion technologies are not presently capable of supporting turboelectric propulsion needs. For example, even though conventional ATRUs are capable of relatively high power-conversion efficiency and reliability, conventional ATRU technology must make a critical tradeoff of weight versus power quality. With some conventional technologies, a Total Current Harmonic Distortion (THDi) of less than 5% is achievable, however requiring a 24 or 30 pulse design. A conventional 24-pulse design carries a weight penalty of approximately 50% relative to industry leading 12 or 18 pulse solutions which will generate 7-13% THDi. This poses a key tradeoff of weight versus power quality to the aircraft system designer. Most existing iterations of MEA have preferred to take weight savings at the expense of power quality for applications between 10 and 100 kW.

However, sacrificing power quality becomes far less palatable as ATRU power demand increases above 100 kW. Due to increased line impedance at harmonic frequencies, excessive current harmonics significantly distort the AC power distribution system waveform. This causes a variety of harmful effects, including increased conducted interference problems in other equipment on the AC bus, low power factor (resulting in over-sizing of generators to deliver apparent power rather than actual power and excessive heating in the distribution system), excessive radiated magnetic fields, excessive heating of generators and motors, and increased wearout and acoustical noise in rotating devices (due to harmonic torque).

The above described shortcomings of the conventional technology may be overcome with a 24-pulse ATRU based on asymmetrical power processing in accordance with the present technology. In some embodiments, a 24-pulse ATRU in accordance with the inventive technology achieves greater than 98% efficiency, less than 5% THDi, and a power to weight ratio of greater than 5 kW per kg. With the inventive asymmetric autotransformer, the output voltages are unbalanced relative to neutral.

In some embodiments, the asymmetric 24-pulse ATRU is a power converter which converts a 3-phase AC input first into 12-phase AC for power factor correction and harmonic current cancellation, then into a DC output via a 24-pulse rectifier bridge. In some embodiment, the asymmetric approach entails passing the 3-phase AC input directly to the rectifier bridge as well as to the autotransformer. The autotransformer generates 9 additional phases that are also fed to the rectifier bridge for a total of 12 phases. This allows significant savings in weight and power dissipation since the autotransformer only processes approximately one third of the power delivered to the ATRU output while still providing harmonic current cancellation necessary to minimize input current harmonic distortion and maximize power factor. Additionally, the autotransformer contains an embodied delta in its winding configuration which provides inherent triplen harmonic mitigation. With the inventive technology, the autotransformer windings use delta configuration, which processes main power and serves as low impedance pass for triplen harmonic currents. Conventional autotransformers with hexagonal winding configurations do not provide low impedance pass for triplen harmonic currents, and as a result they require an additional delta winding (typically 5-legged core) to perform this function. In some embodiments, the autotransformer includes three core legs, each with one coil wound upon it (e.g., coil A, B or C). Each coil may include only seven distinct windings, thus facilitating reduced assembly complexity and cost.

FIG. 1A illustrates an ATRU 1000 according to an embodiment of inventive technology. At the input side, 3-phase 230 Volt AC power 100 is supplied to an autotransformer 300. In the representative embodiments described below, the autotransformer converts the 3-phase input (A, B, C) into 9 auxiliary phases (1-9) which are fed to a secondary rectifier circuit 400, providing 18 of the 24 total pulses necessary for 24-pulse operation. The 3-phase input is also fed directly to a main rectifier circuit 200, providing the remaining 3 phases and 6 pulses for a 24-pulse operation. The rectifier circuits 200 and 400 can include arrangements of diodes that rectify the input AC voltage into DC voltage. With the inventive technology autotransformer, the ATRU outputs high-quality 540 Volt DC while maintaining a 24-pulse input waveform with high power factor and low harmonic content.

The direct feed-through of the three input phases to the main rectifier circuit 200 allows the majority of power (e.g., about 66%) being processed by the ATRU to bypass the autotransformer 300. As a result, a significant size, weight, and dissipation reduction may be achieved in the autotransformer 300. The 66% vs. 34% distribution of power is an illustrative embodiment only, in other embodiments different fractions of power may be achieved at the main rectifier circuit 200 and the secondary rectifier circuit 400. In general, a reduction of the power at the autotransformer 300 also reduces the weight and size of the autotransformer.

Figure 1B:
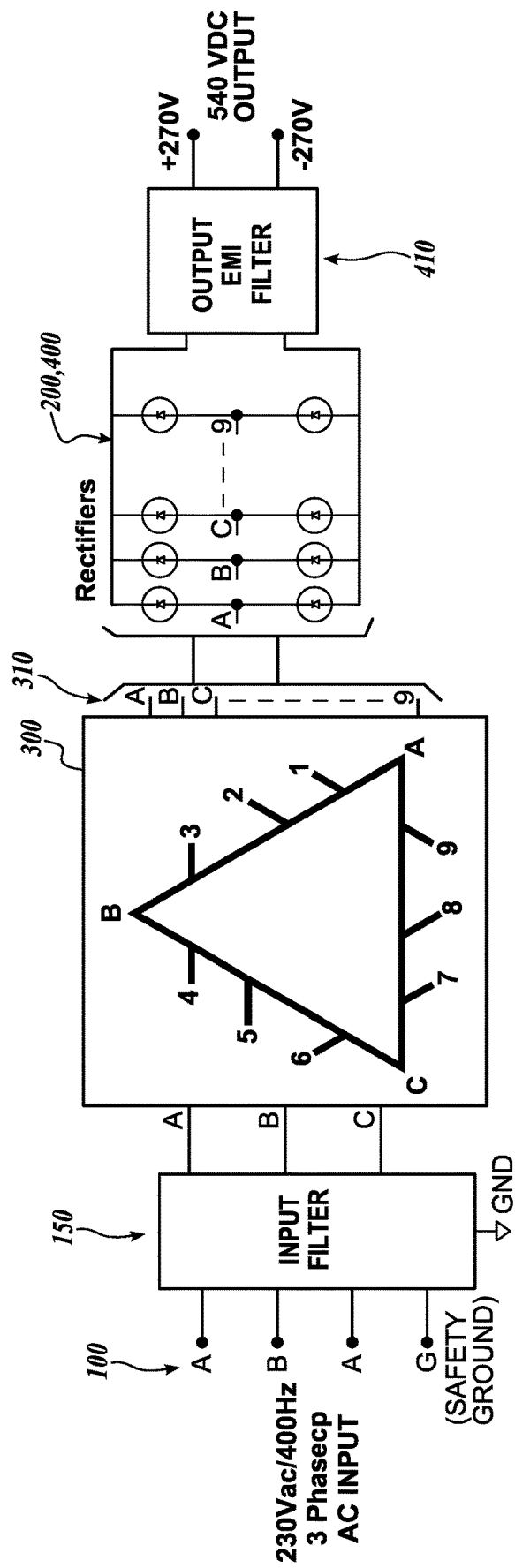
FIG. 1B illustrates an ATRU according to an embodiment of inventive technology.

FIG. 1B also illustrates an ATRU according to an embodiment of inventive technology. The 3-phase input is fed through an input filter 150 into the autotransformer 300. In the illustrated embodiment, the 12 output phases (3 main phases A, B, C and 9 auxiliary phases 1-9, collectively "output phases 310") are coupled to a common rectifier circuit that rectifies the 12 phases into 24 pulses. The resulting pulses may be fed through an output electromagnetic interference (EMI) filter 410. The illustrated ATRU converts a 230 Volt AC input to a 540 Volt DC output.

Figure 2:
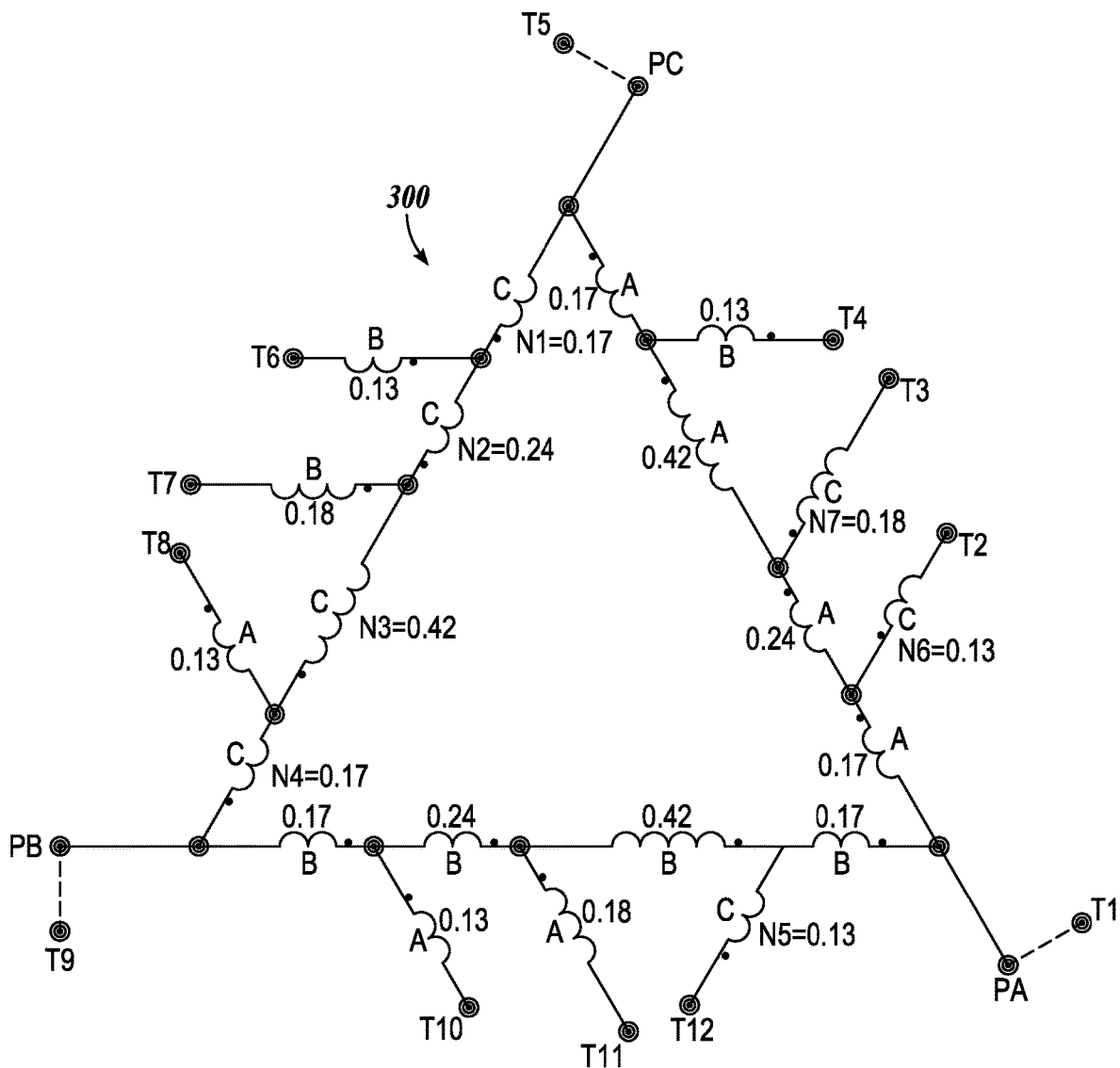
FIG. 2 illustrates delta-wound autotransformer windings according to an embodiment of inventive technology.

FIG. 2 illustrates delta-wound autotransformer windings according to an embodiment of inventive technology. The illustrated delta-wound autotransformer includes three input points PA, PB and PC for the 230 Volt AC, 3-phase input; and the twelve output taps (T1-T12) for the 12 output phases (3 main phases and 9 auxiliary phases of the autotransformer). The topology orientation is exemplary, and different topology may apply in different embodiments.

The turns ratio for each winding of the illustrated embodiment is labeled adjacent to the winding. For example, the serial windings along the C-coil, corresponding to N1, N2, N3, and N4, have turns ratios of 0.17, 0.24, 0.42 and 0.17, respectively. The correction windings corresponding to N5, N6 and N7 have turns ratios of 0.13, 0.13 and 0.18 respectively. The number of turns of the windings on the A- and B-coils is equal to those of the C-coil.

The turns ratio for a given winding is defined as the ratio of the winding's turns to the total turns between each input phase. In some embodiments, the illustrated turns ratios may be approximate, because the optimum turns ratios may vary with autotransformer construction, different parasitics, and use case. As a result, a practically-implemented turns count may vary with the selected autotransformer core. Examples of turns counts of the autotransformer embodiment illustrated in FIG. 2 are shown in Tables 1 and 2 below.

Table 1 illustrates sample turn ratios for an autotransformer having 139 turns along each of the A-, B- and C-coils. For example, the N1 segment includes 24 turns, while the N2 segment includes 33 turns. Similarly, the secondary winding N6 includes 18 turns, while the secondary winding N7 includes 25 turns. The ratio of these turns over the number of turns of an individual coil (139 turns in the illustrated example) is shown in the "turns ratio" column.

TABLE 1

Sample turn ratios

|    | turns count | turns ratio |
| --- | --- | --- |
| N4 | 24 | 0.17 |
| N5 | 18 | 0.13 |
| N3 | 58 | 0.42 |
| N7 | 25 | 0.18 |
| N2 | 33 | 0.24 |
| N6 | 18 | 0.13 |
| N1 | 24 | 0.17 |

Table 2 illustrates voltage magnitudes (column "mag") and phases (column "phase") for the autotransformer shown in FIG. 2 (with implemented practical corrections to turns ratios in order to compensate for parasitics including winding impedance and leakage inductance). In general, voltage differential at corresponding tap pairs (column "mag") is almost constant. The phase differentials in the "phase delta" columns are also almost constant, corresponding to 15° increments from one bridge rectifier conduction pair to the next.

For an autotransformer in accordance with the embodiments of inventive technology, correction winding phase voltages are controlled as the phase-to-phase voltages relative to the opposite input phase voltage, forming balanced bridge rectifier conduction pairs with nominal 15 degree spacing. This differs from conventional symmetric autotransformer design approaches, which are oriented to achieve balanced phase to neutral correction winding voltages. For example, referring to the autotransformer of FIG. 2 and the values in Table 2, the tap T4 is paired to the phase B to express relative voltage and phase magnitudes. As another example, the tap T12 is paired to the phase C to express relative voltage and phase magnitude. Table 2 contains the nominal voltage magnitude and phase of all bridge rectifier conduction pairs for the autotransformer of FIG. 2. A bridge rectifier conduction pair consists of 2 phases provided to the bridge rectifier which will conduct to and from each other at a consistent point within each full electrical cycle. For an autotransformer in accordance with the embodiments of inventive technology, each conduction pair will conduct twice per full electrical cycle, once in each polarity. As an example, this can be seen in Table 2 where the voltage (Phase A—T8) has phase −14.97 degrees, and the voltage (T8—Phase A) has a phase of −194.97 degrees, a 180 degree phase difference which is indicative of reversed voltage polarity.

TABLE 2

Magnitude and Phase Line to Line, Bridge Rectifier Conduction Pairs

|  | mag | phase | phase delta |
| --- | --- | --- | --- |
| Phase A-Phase B | 398.37 | 0.00 deg | 14.97 deg |
| Phase A-T8 | 403.47 | −14.97 deg | 14.97 deg |
| Phase A-T7 | 407.05 | −30.00 deg | 15.03 deg |
| Phase A-T6 | 403.47 | −45.03 deg | 15.03 deg |
| Phase A-Phase C | 398.37 | −60.00 deg | 14.97 deg |
| T12-Phase C | 403.47 | −74.97 deg | 14.97 deg |
| T11-Phase C | 407.05 | −90.00 deg | 15.03 deg |
| T10-Phase C | 403.47 | −105.03 deg | 15.03 deg |
| Phase B-Phase C | 398.37 | −120.00 deg | 14.97 deg |
| Phase B-T4 | 403.47 | −134.97 deg | 14.97 deg |
| Phase B-T3 | 407.05 | −150.00 deg | 15.03 deg |
| Phase B-T2 | 403.47 | −165.03 deg | 15.03 deg |
| Phase B-Phase A | 398.37 | −180.00 deg | 14.97 deg |
| T8-Phase A | 403.47 | −194.97 deg | 14.97 deg |
| T7-Phase A | 407.05 | −210.00 deg | 15.03 deg |
| T6-Phase A | 403.47 | −225.03 deg | 15.03 deg |
| Phase C-Phase A | 398.37 | −240.00 deg | 14.97 deg |
| Phase C-T12 | 403.47 | −254.97 deg | 14.97 deg |
| Phase C-T11 | 407.05 | −270.00 deg | 15.03 deg |
| Phase C-T10 | 403.47 | −285.03 deg | 15.03 deg |
| Phase C-Phase B | 398.37 | −300.00 deg | 14.97 deg |
| T4-Phase B | 403.47 | −314.97 deg | 14.97 deg |
| T3-Phase B | 407.05 | −330.00 deg | 15.03 deg |
| T2-Phase B | 403.47 | −345.03 deg | 15.03 deg |
| Sum |  |  | 360.00 deg |

Figure 3:
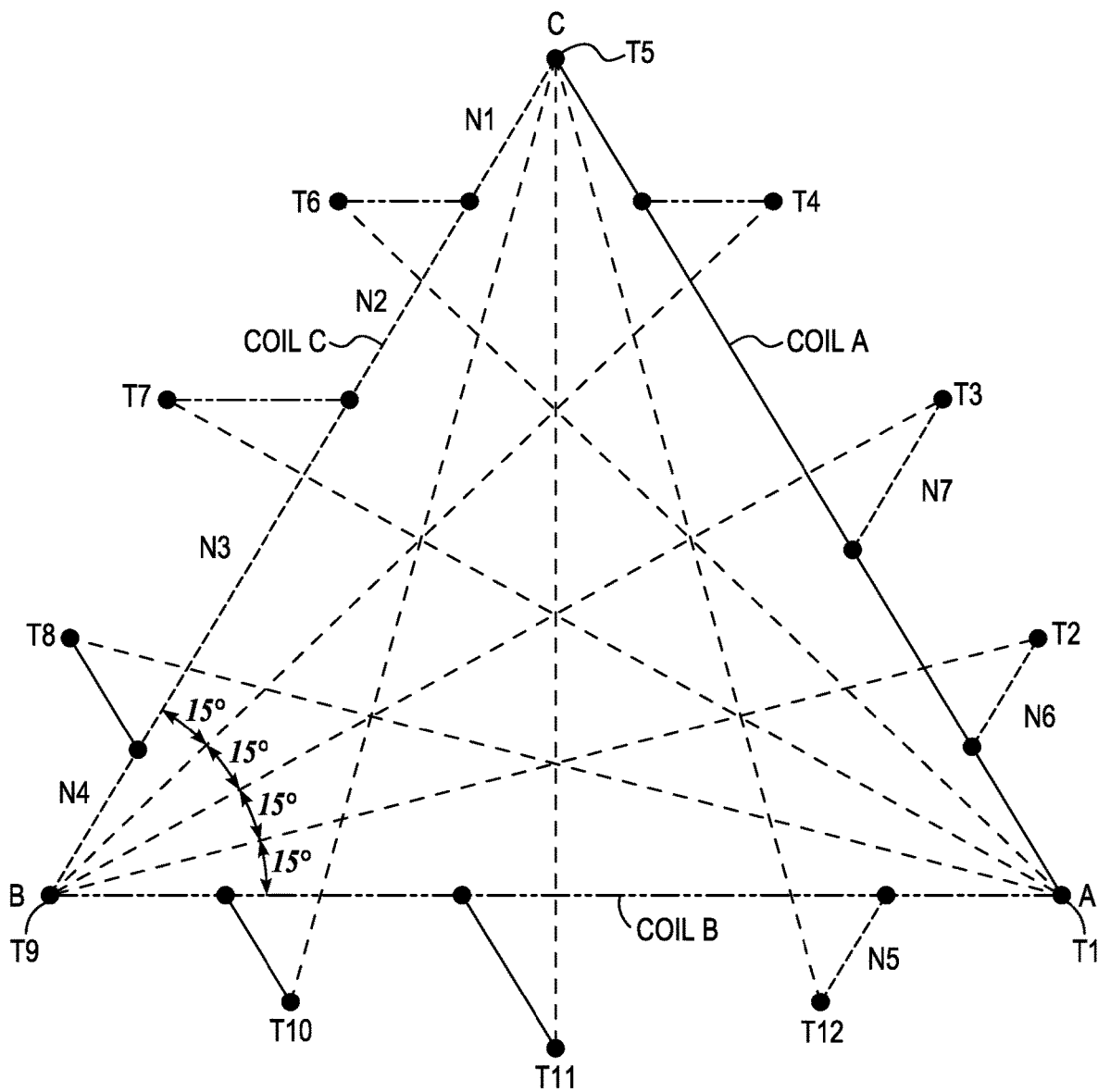
FIG. 3 illustrates delta-wound autotransformer topology diagram for the autotransformer of FIG. 2.

FIG. 3 illustrates delta-wound autotransformer topology diagram for the autotransformer of FIG. 2. The delta configuration includes three input points A, B, and C., for the three-phase AC input. Each side of the delta has 4 serial windings. Moving clockwise from B to C, serial windings N4, N3, N2, and N1 are interposed between B and C. Analogous, windings are interposed between C and A and between A and B, but are unlabeled on the diagram to reduce clutter.

A sample method for determining the phase-to-phase voltage in an asymmetric autotransformer is described as follows. The sample method includes drawing a vector from the end of each correction winding (e.g., taps T6, T7) to the opposite vertex of the equilateral triangle (e.g., vertex where phase windings B and C intersect). These vectors represent the autotransformer output phases. Each vector's length is proportional to the corresponding output phase's magnitude relative to the phase represented by the opposite vertex of the triangle (not relative to neutral as in the symmetric autotransformer)—this phase to phase voltage is presented to the bridge rectifier as a conduction pair as shown in Table 2. Designing to balance autotransformer output voltages and phase angles relative to the opposite input phase rather than relative to neutral voltages allows a majority of processed power to bypass the autotransformer without compromising power quality, and allows elimination of interphase transformers. In some embodiments, triplen harmonic mitigation is guaranteed by the main delta winding formed by N1-N4 turns ratios, which provide a suitable winding configuration for triplen harmonics mitigation As noted above, the desired phase shifting of autotransformer output phases is obtained from the correction windings tapped at the select locations between the serial windings traversing the input phases and providing outputs at T2, T3, T4, T6, T7, T8, T10, T11, and T12. The coil that the correction winding is wound upon and winding polarity of the correction winding determine the direction of the phase shift the correction winding provides to its output phase. Each correction winding's turns ratio along with its tapping point between the serial windings determines the final phase angle and magnitude of its output phase. These output phase magnitudes and phases are illustrated diagrammatically by the dotted lines in FIG. 3. For 24 pulse behavior, nominal 15 degree spacing is desired between adjacent phases. As explained above, practical output phase magnitude will depend on autotransformer construction, parasitics (e.g., leakage inductance), and use case (e.g., source and load impedance). For the embodiment illustrated in FIG. 3, the turns counts and turns ratios are shown in Table 3 below.

TABLE 3

Turns Counts and Turns Ratios

| winding | N1 | N2 | N3 | N4 | N5 | N6 | N7 |
|---|---|---|---|---|---|---|---|
| turns count | 24 | 33 | 58 | 24 | 18 | 18 | 25 |
| turns ratio | 0.17 | 0.24 | 0.42 | 0.17 | 0.13 | 0.13 | 0.18 |

Figure 12:
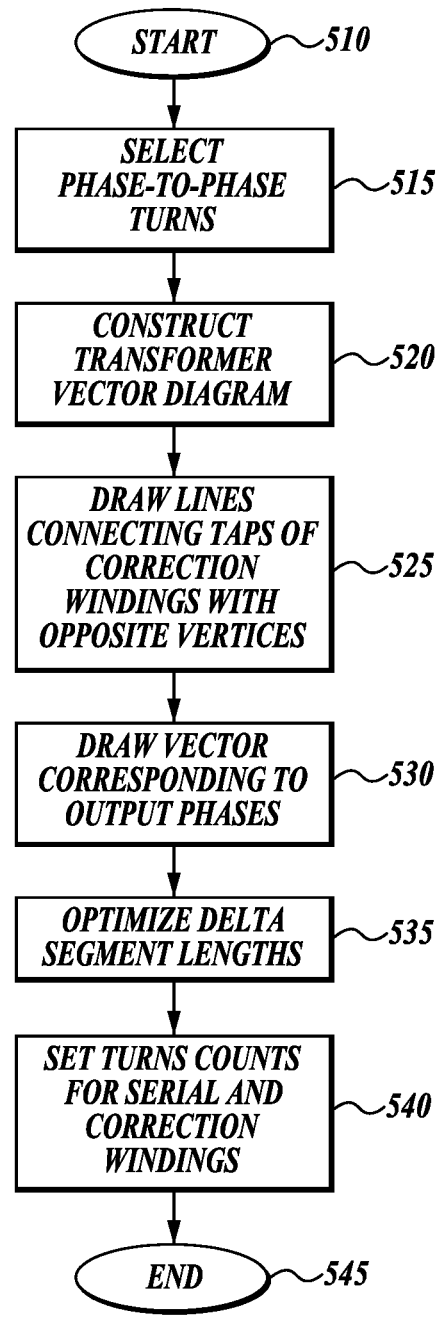
FIG. 12 is a flowchart of a method for designing a 24-pulse asymmetric ATRU according to embodiments of inventive technology.

A sample method for determining the phase-to-phase voltage in an asymmetric autotransformer is illustrated in FIG. 12. In particular, illustrated method outlines a design process of selecting turns ratios for proper output phase magnitudes and spacing for asymmetric 24-pulse operation. In different embodiments, illustrated method may include additional steps or may include other steps not shown in the flowchart.

The method may start in block 510. In block 515, phase-to-phase turns counts are selected to maintain acceptable flux density for selected core, operating frequency, and operating voltage.

In block 520, transformer vector diagram is constructed using an equilateral triangle with leg lengths proportional to the number of turns between phases. Each side of the triangle represents a complete delta winding and consists of 4 segments between each pair of triangle vertices (see, e.g., FIGS. 2 and 3). Each segment represents a serial winding and has a length proportional to the turns count of the applicable serial winding. The 3 points between the vertices of each leg where segments meet represent locations of the correction winding tap.

In block 525, lines are drawn representing correction windings off of each tap location between triangle vertices. Each line is a vector with phase equivalent to the phase of the coil the correction winding is wound upon and length proportional to correction windings turn count. Each vector runs parallel to one of the sides of the triangle. Each correction winding's turns ratio is equivalent to the turns count of the correction winding divided by the turns count of the full delta winding. This is illustrated on the transformer vector diagram as the length of the correction winding vector to the length of a full leg of the equilateral triangle.

In block 530, a vector is drawn from the end of each correction winding vector to the opposite vertex of the equilateral triangle. These vectors represent the autotransformer output phases. Each vector's length is proportional to the corresponding output phase's magnitude relative to the phase represented by the opposite vertex of the triangle. Vectors can be drawn from each output tap to neutral which accurately indicate output phase voltage relative to neutral, but due to the nature of the asymmetric design these phase to neutral voltages will be uneven. Controlling phase-to-phase voltages rather than phase-to-neutral is a difference between asymmetric and symmetric design approaches.

In block 535, delta segment lengths are optimized while maintaining constant total delta length to adjust tap locations. In some embodiments, correction winding vector lengths are adjusted until output phase vector lengths are approximately equal to the lengths of each side of the equilateral triangle, and all vectors originating from each triangle vertex maintain approximately 15 degree phase spacing. Examples of complete transformer vector drawings created using this method can be seen in FIGS. 3 and 5-11.

In block 540, autotransformer serial and correction windings turns counts are set based on the final lengths of each serial winding line segment and correction winding vector in the transformer vector drawing. The method may end in block 545.

Figure 4:
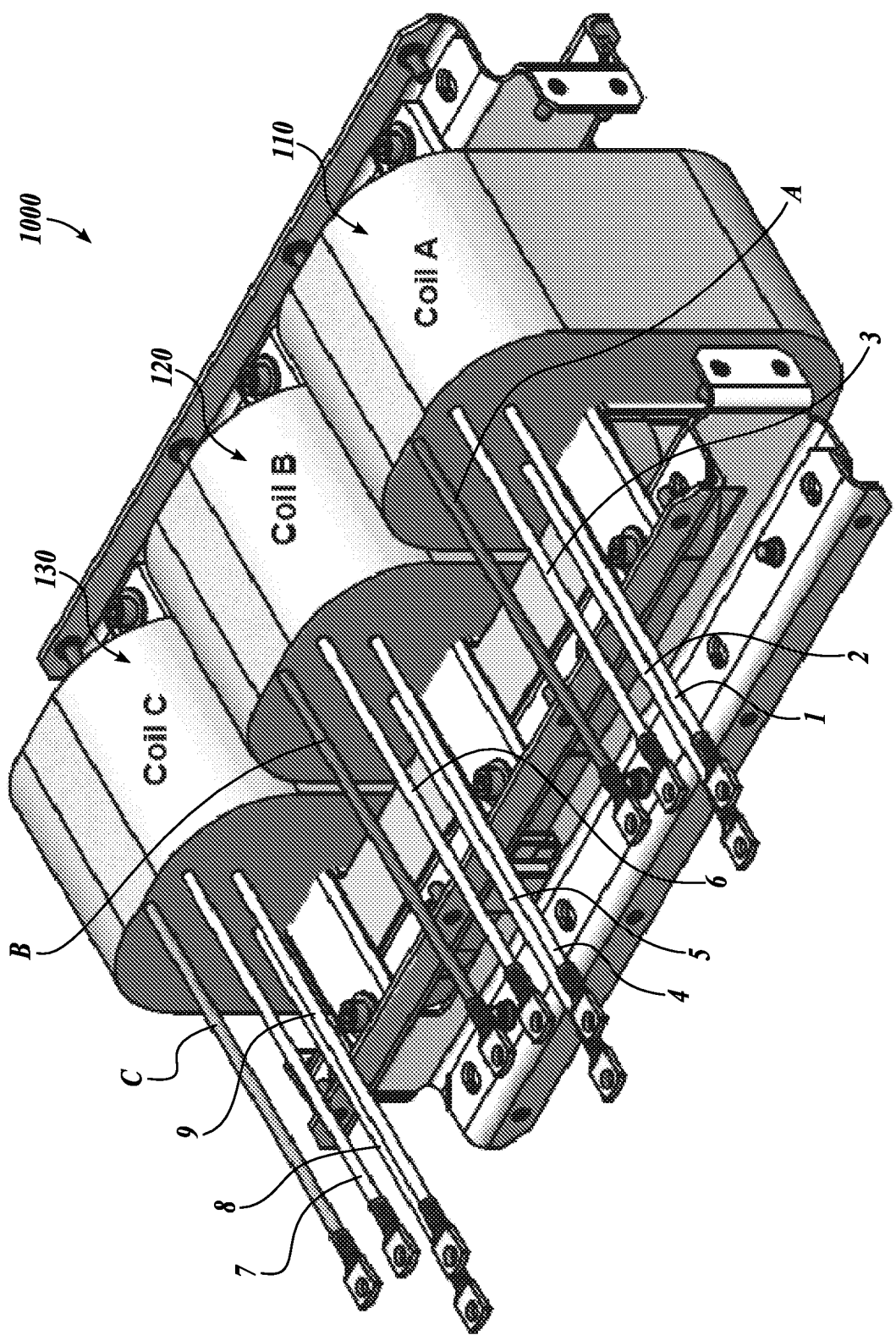
FIG. 4 illustrates a delta-wound autotransformer according to an embodiment of inventive technology.

FIG. 4 illustrates a delta-wound autotransformer according to an embodiment of inventive technology. In some embodiments, the coils A, B and C are housed in their respective housings 110, 120 and 130. The output ports 1-9 are connected to their respective coils through the secondary windings (e.g., secondary windings N6 and N7 connected to coil A). In operation, the free ends of the wires A, B, C, and 1-9 are connected to the main/secondary rectifier circuits 200, 400.

FIGS. 5-11 illustrate delta-wound autotransformer topology diagrams according to embodiments of inventive technology. For the embodiments illustrated in FIGS. 5-11, the turns counts and turns ratios are shown in Table 4 below. In different embodiments, these turns counts and turns ratios are determined using the method illustrated in FIG. 12.

TABLE 4

Turns Counts and Turns Ratios

Figure 5:
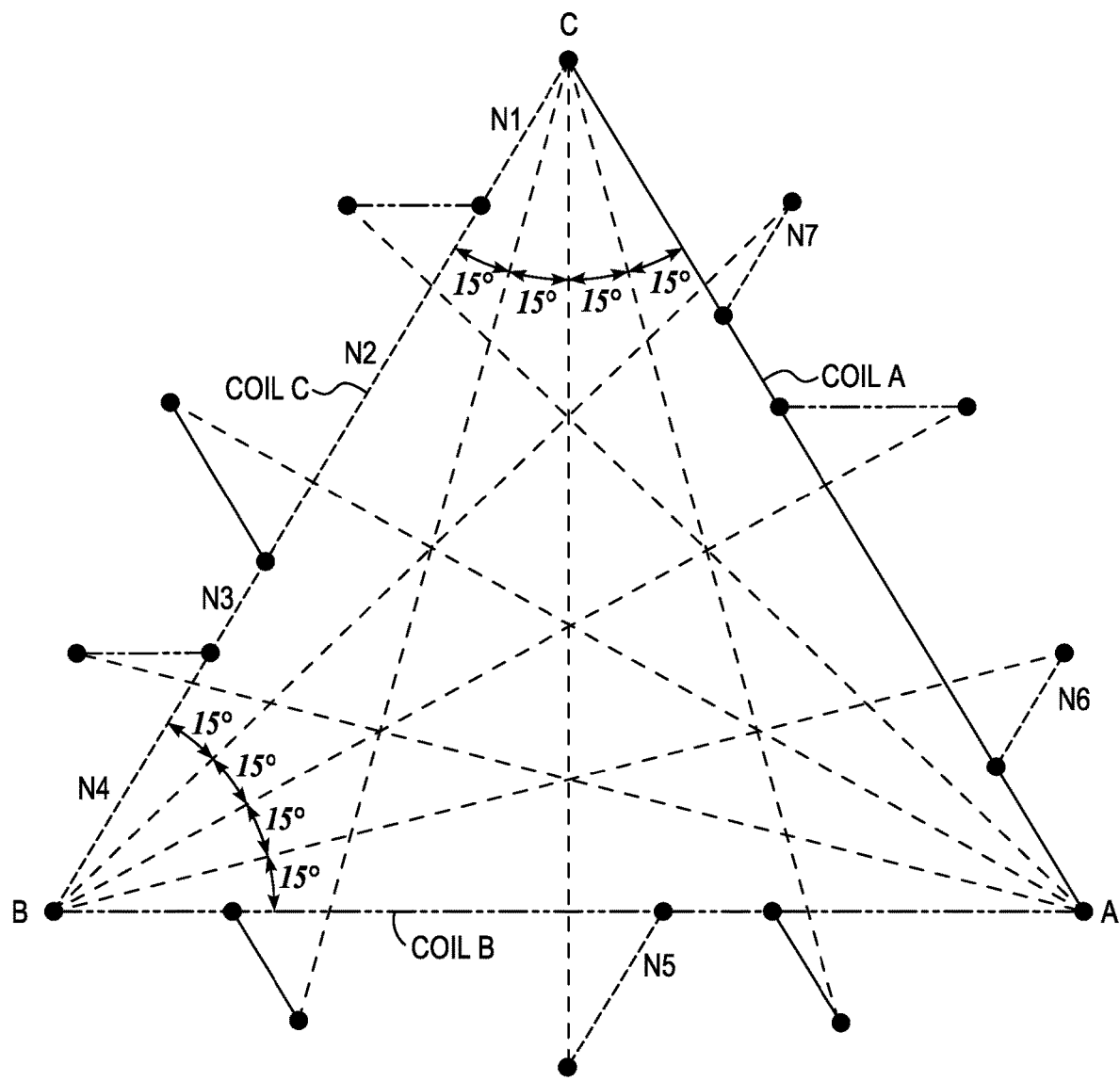
FIGS. 5-11 illustrate delta-wound autotransformer topology diagrams according to embodiments of inventive technology.
Figure 6:
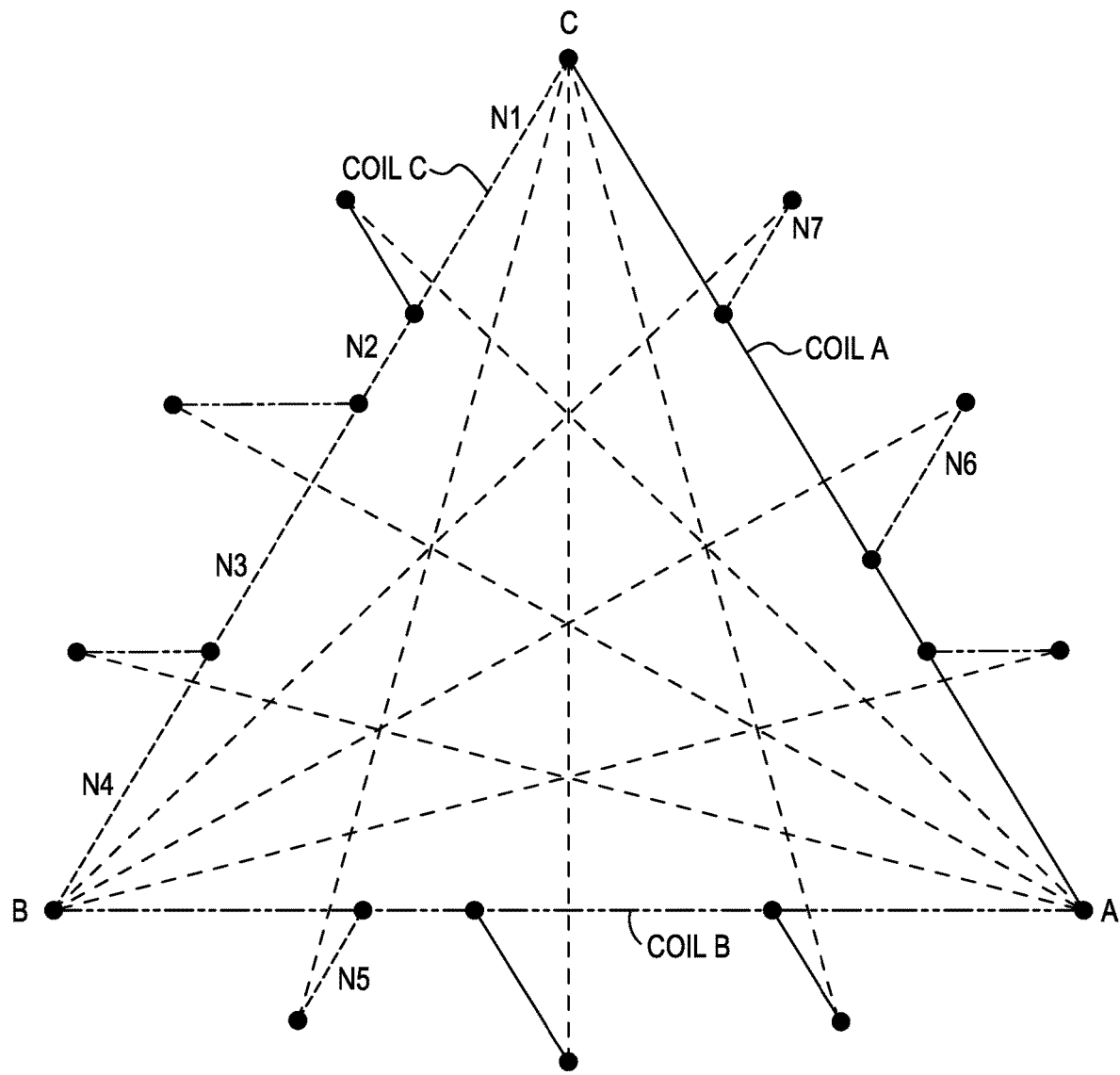
Figure 7:
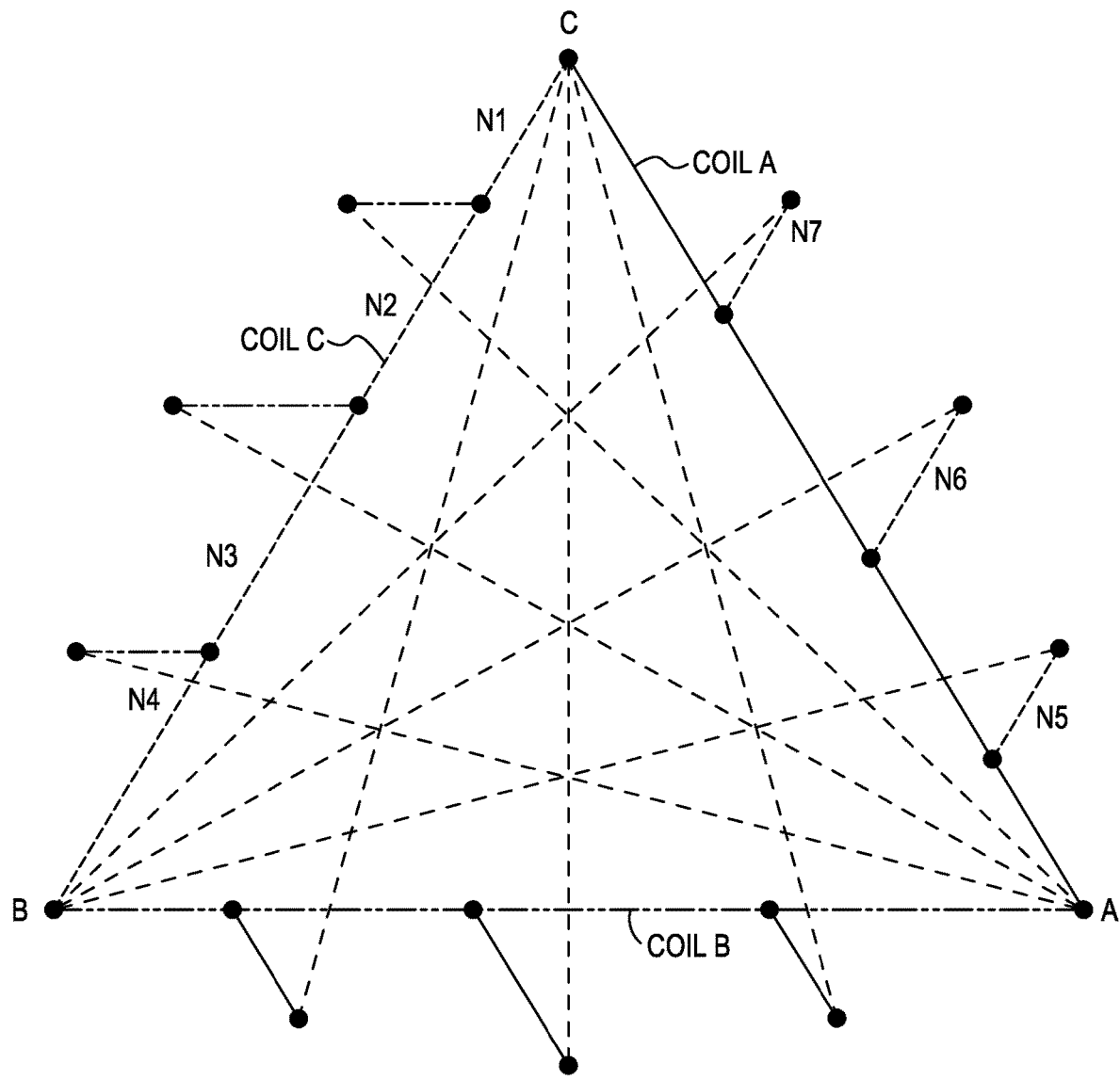
Figure 8:
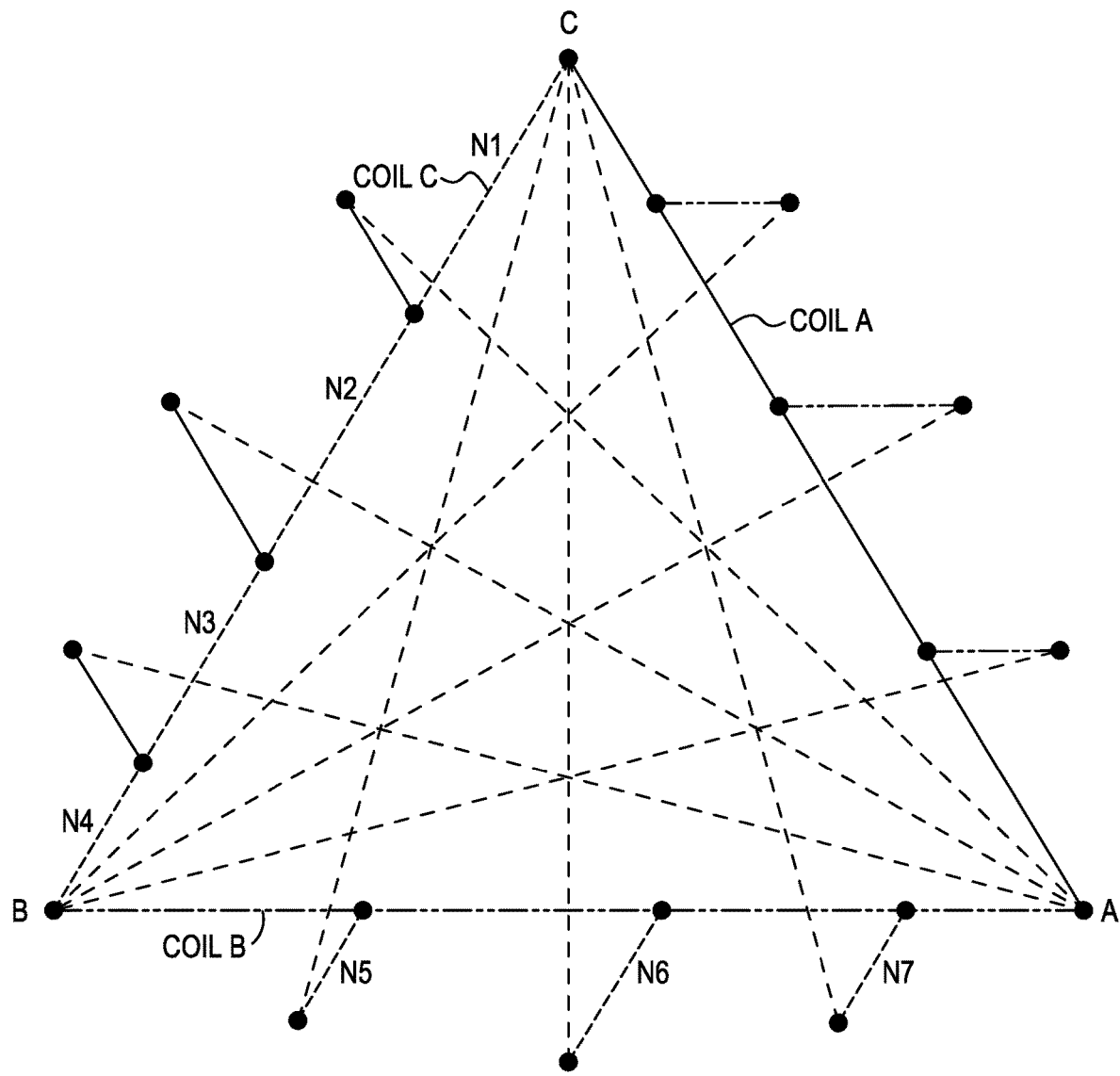
Figure 9:
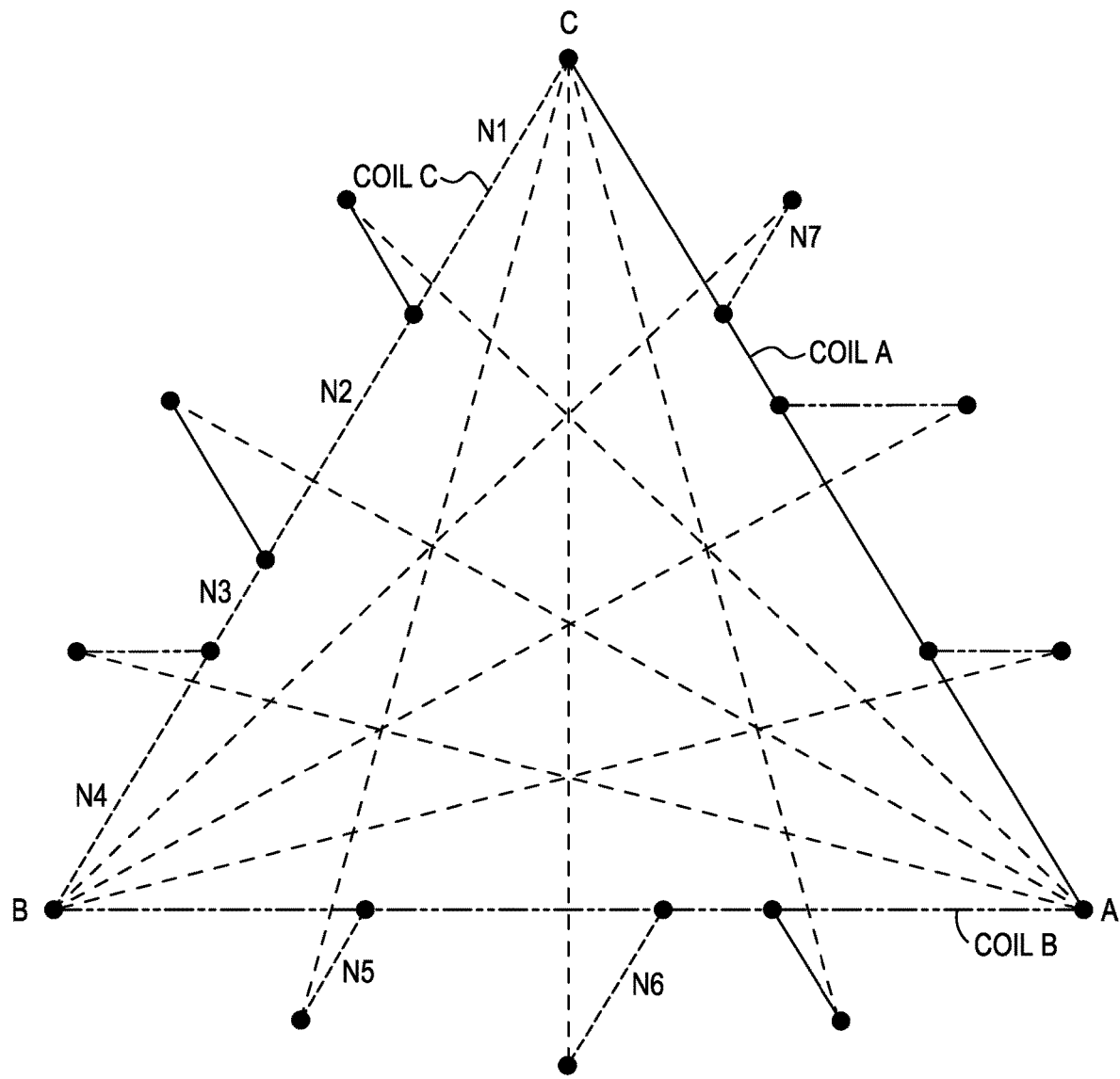
Figure 10:
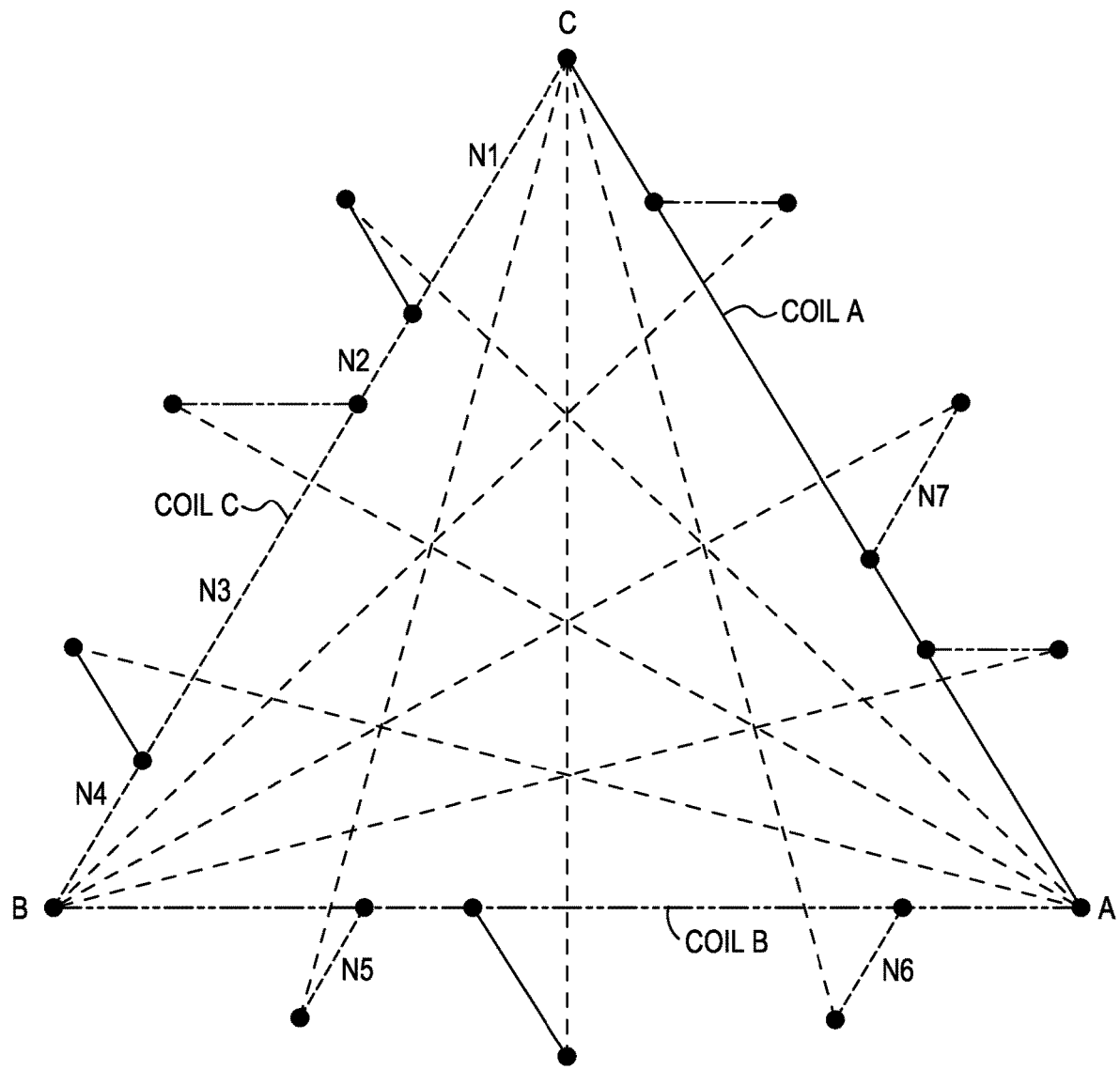
Figure 11:
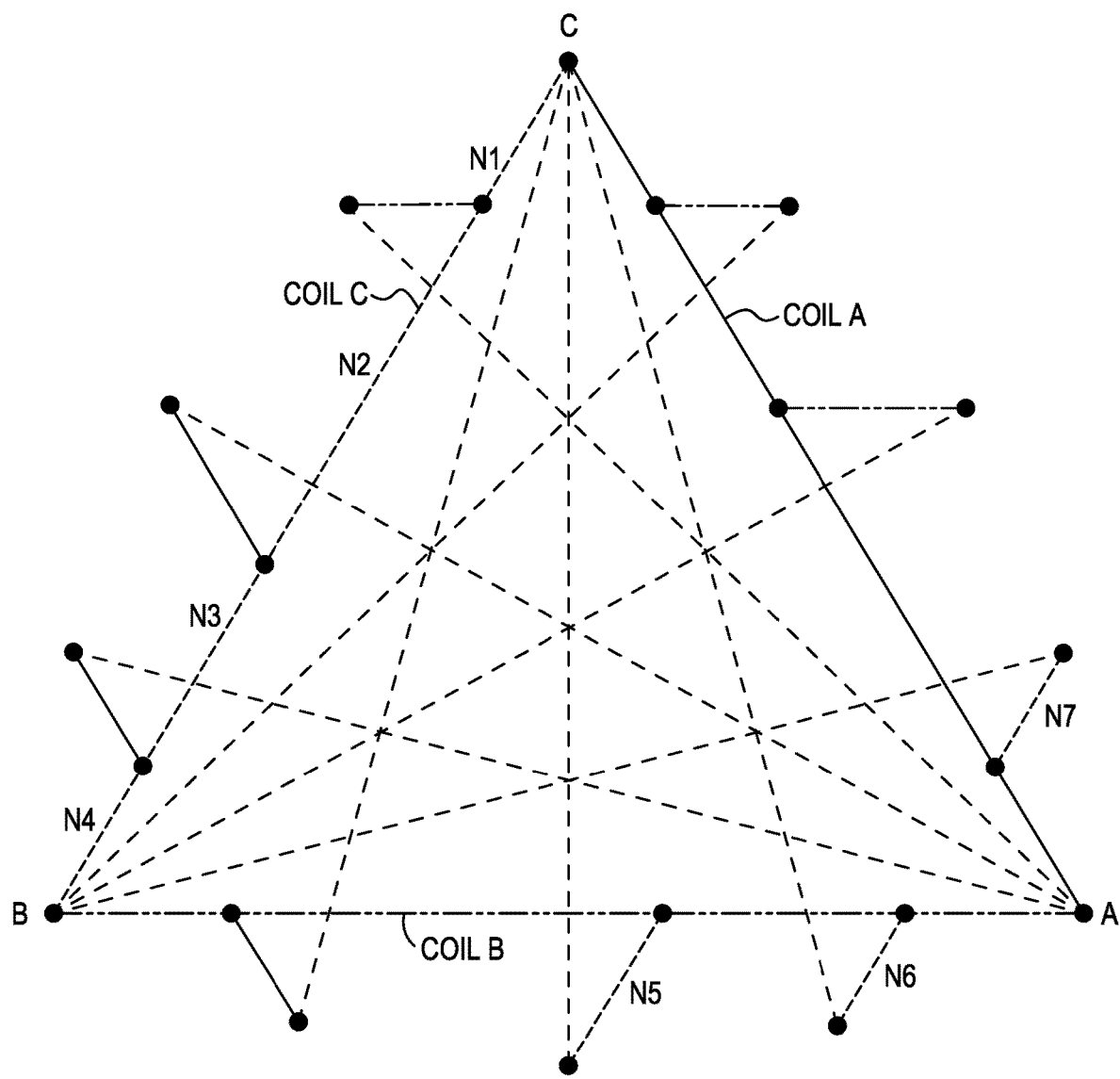

| | winding | N1 | N2 | N3 | N4 | N5 | N6 | N7 |
|---|---|---|---|---|---|---|---|---|
| Figure 5 | turns count | 24 | 58 | 15 | 42 | 25 | 18 | 18 |
| | turns ratio | 0.17 | 0.42 | 0.11 | 0.30 | 0.18 | 0.13 | 0.13 |
| Figure 6 | turns count | 42 | 15 | 40 | 42 | 18 | 25 | 18 |
| | turns ratio | 0.30 | 0.11 | 0.29 | 0.30 | 0.13 | 0.18 | 0.13 |
| Figure 7 | turns count | 24 | 33 | 40 | 42 | 18 | 25 | 18 |
| | turns ratio | 0.17 | 0.24 | 0.29 | 0.30 | 0.13 | 0.18 | 0.13 |
| Figure 8 | turns count | 42 | 40 | 33 | 24 | 18 | 25 | 18 |
| | turns ratio | 0.30 | 0.29 | 0.24 | 0.17 | 0.13 | 0.18 | 0.13 |
| Figure 9 | turns count | 42 | 40 | 15 | 42 | 18 | 25 | 18 |
| | turns ratio | 0.30 | 0.29 | 0.11 | 0.30 | 0.13 | 0.18 | 0.13 |
| Figure 10 | turns count | 42 | 15 | 58 | 24 | 18 | 18 | 25 |
| | turns ratio | 0.30 | 0.11 | 0.42 | 0.17 | 0.13 | 0.13 | 0.18 |
| Figure 11 | turns count | 24 | 58 | 33 | 24 | 25 | 18 | 18 |
| | turns ratio | 0.17 | 0.42 | 0.24 | 0.17 | 0.18 | 0.13 | 0.13 |

FIGS. 13-16 are graphs of simulated current waveforms for a 24-pulse asymmetric ATRU utilizing an ideal autotransformer of the topology depicted in FIG. 3. The simulated asymmetric ATRU is called "ideal" because non-idealities such as leakage inductance and winding resistance are neglected. FIG. 17 is a graph of actual 3-phase input current waveforms according to an embodiment of inventive technology. In each of these graphs, the horizontal axis shows time elapsed. The vertical axis shows electrical current in Amperes.

Figure 13:
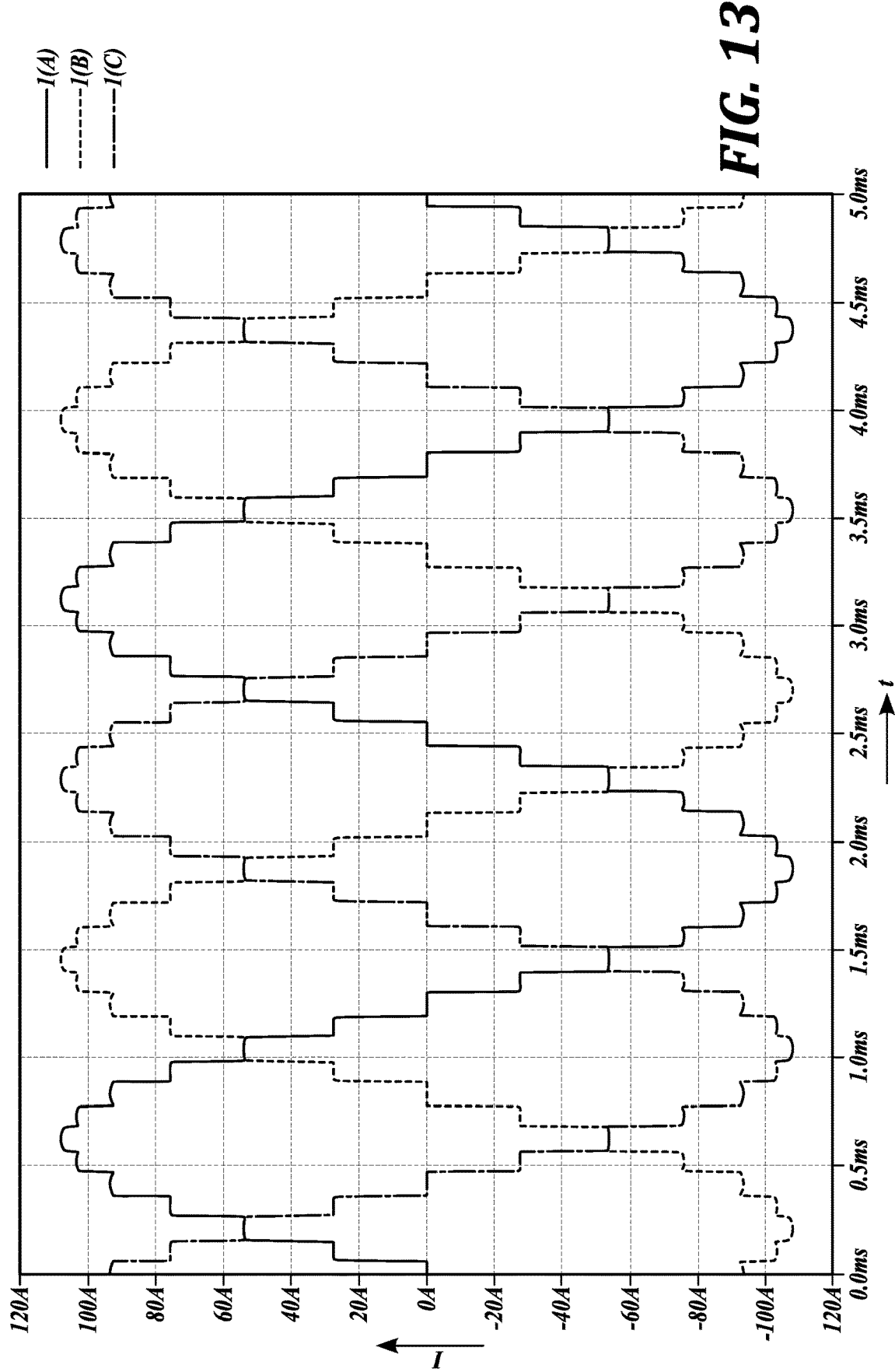
FIG. 13 is a graph of simulated 3-phase input current waveforms for a 24-pulse asymmetric ATRU utilizing an ideal autotransformer of the topology depicted in FIG. 3.

In particular, FIG. 13 is a graph of simulated 3-phase input current waveforms for a 24-pulse asymmetric ATRU utilizing an ideal autotransformer of the topology depicted in FIG. 3. Ideal autotransformer without leakage inductance or winding resistance exhibits with a sinusoidal voltage input a stepped current waveform approximating a sine wave with 24 "steps" or "pulses". This is the result of bridge rectifier conduction pairs switching every 15 degrees. Addition of leakage inductance and winding resistance serves to smooth the waveform so that end result is nearly sinusoidal (as shown below in FIG. 17).

Figure 14:
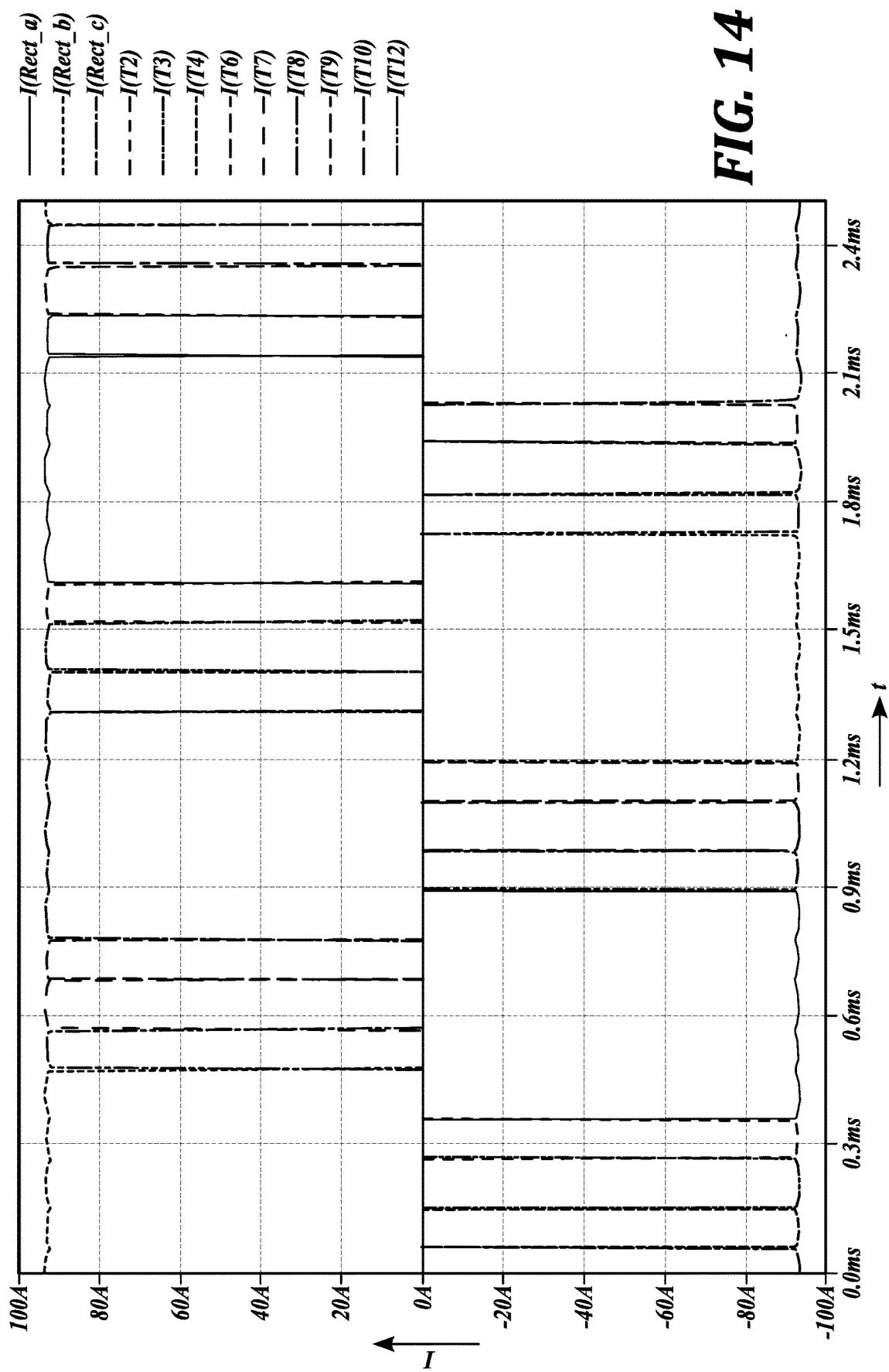
FIG. 14 is a graph of simulated rectifier bridge currents for a 24-pulse asymmetric ATRU utilizing an ideal autotransformer of the topology depicted in FIG. 3.

FIG. 14 is a graph of simulated rectifier bridge currents for a 24-pulse asymmetric ATRU during one full electrical cycle at 400 Hz. The 15 degree spacing of bridge rectifier conduction pairs can be seen in FIG. 14, where each conductive pair can be seen to conduct for slightly over 100 microseconds, or approximately 15 electrical degrees of the given 400 Hz cycle, which has a period of 2.5 ms. Additionally, it can be seen in FIG. 14 as well as in Table 2 that each input phase connection to the bridge rectifier conducts current for 5 consecutive pulses, whereas each correction winding only conducts current for 1 pulse in a given half-cycle. This is indicative of the majority of power being processed by the ATRU bypassing the autotransformer, which allows increased efficiency and reduced weight.

Figure 15:
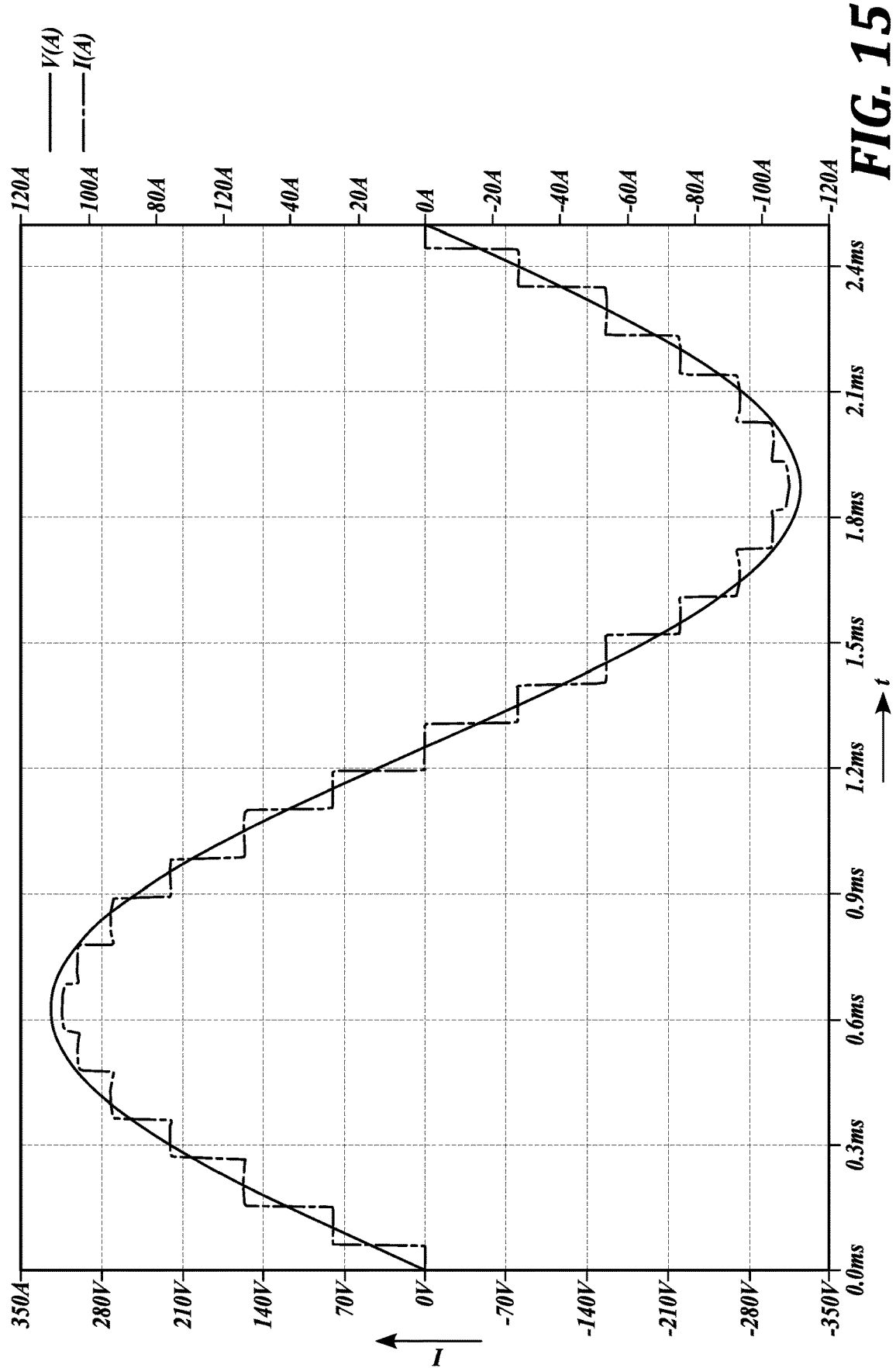
FIG. 15 is a graph of simulated phase A input voltage and current for a 24-pulse asymmetric ATRU utilizing an ideal autotransformer of the topology depicted in FIG. 3.
Figure 16:
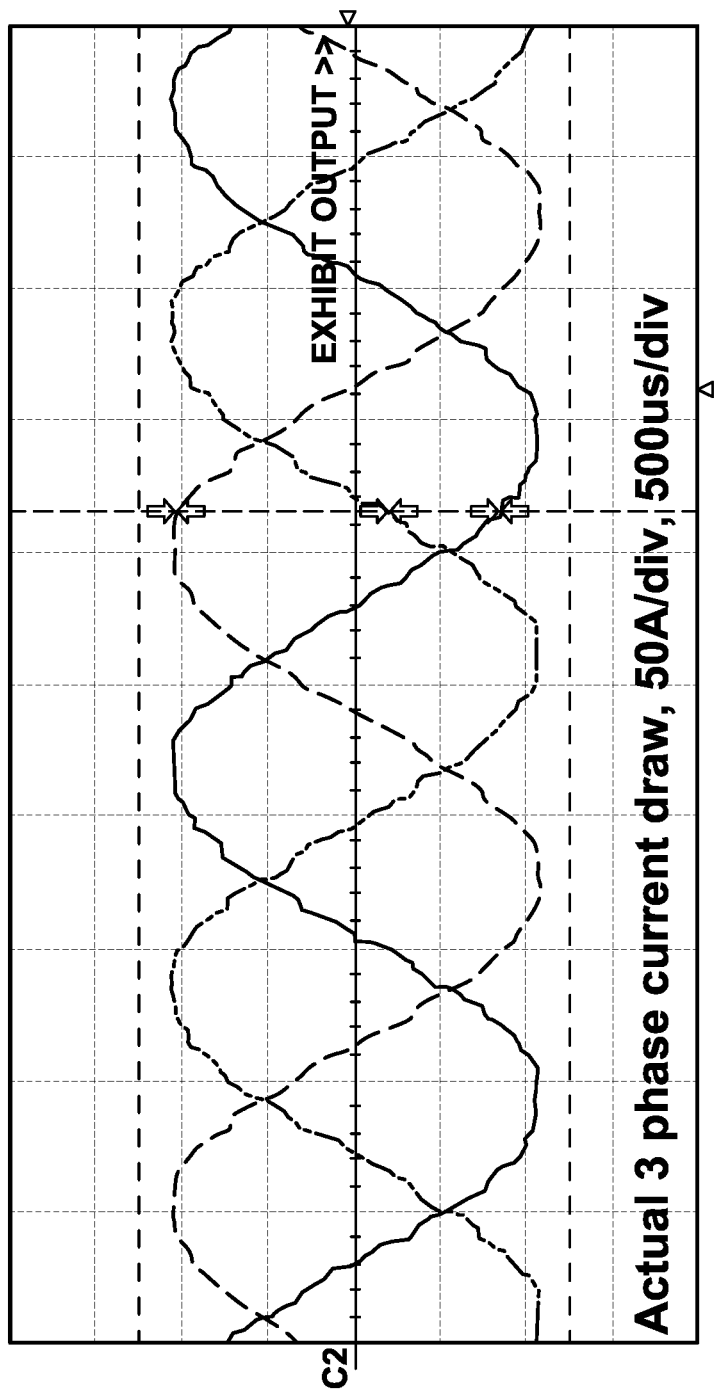
FIG. 16 is a graph of actual 3-phase input current waveforms according to an embodiment of inventive technology.

FIG. 15 is a graph of simulated phase A input voltage and current for a 24-pulse asymmetric ATRU utilizing an ideal autotransformer of the topology depicted in FIG. 3; and. FIG. 16 is a graph of actual 3-phase input current waveforms according to an embodiment of inventive technology. In the embodiment illustrated in FIG. 17, the actual current waveforms are smoother (indicating lower harmonic distortion) than the ideal input current waveforms shown in FIG. 13. This is because the presence of small amounts leakage inductance can serve to smooth the input current waveform. In general, leakage inductance should generally be kept as small as possible, though. As can be seen in FIGS. 14 and 15, the correction windings carry pulse currents of high magnitude and short duration. If leakage inductance is allowed to be too large, these pulse currents cannot reach their full magnitude, and the 24-pulse operation may be degraded such that the effective pulse count is reduced and the performance of the 24-pulse ATRU more closely matches an 18 or 12 pulse solution.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein. In the context of this disclosure, the term "about" means+/−5% of the stated value.

For the purposes of the present disclosure, lists of two or more elements of the form, for example, "at least one of A, B, and C," is intended to mean (A), (B), (C), (A and B), (A and C), (B and C), or (A, B, and C), and further includes all similar permutations when any other quantity of elements is listed.

The invention claimed is:

1. A system, comprising:
   an asymmetric autotransformer, comprising:
   a first coil, a second coil and a third coil of a delta winding, wherein each coil is energized at its corresponding input phase;
   a first plurality of correction windings coupled to the first coil;
   a second plurality of correction windings coupled to the second coil; and
   a third plurality of correction windings coupled to the third coil; and
   a bridge rectifier comprising a plurality of rectifiers coupled to respective individual correction windings,
   wherein phases of the individual correction windings are asymmetric such that individual phase voltages are controlled relative to the opposite input phase, and wherein voltages are unbalanced relative to neutral.

2. The system of claim 1, wherein each plurality of correction windings includes three individual windings.

3. The system of claim 2, wherein tap points of each plurality of correction windings separate each corresponding coil of the delta winding into four segments.

4. The system of claim 3, wherein the bridge rectifier receives 12 AC phases at inputs of its corresponding diodes, and wherein the bridge rectifier outputs DC voltage.

5. The system of claim 1, wherein the bridge rectifier comprises:
   a main rectifier configured for rectifying AC voltages of the input phases; and
   a secondary rectifier configured for rectifying AC voltages of the correction windings.

6. The system of claim 5, wherein the main rectifier provides about 66% of DC power, and wherein the secondary rectifier provides about 34% of DC power.

7. The system of claim 1, wherein the delta winding constitutes a low impedance pass for triplen harmonics.

8. The system of claim 1, wherein individual phase voltages are about 15 deg offset from one phase to a next adjacent phase at the bridge rectifier.

* * * * *